United States Patent [19]

Popenoe

[11] Patent Number: 4,904,132
[45] Date of Patent: Feb. 27, 1990

[54] OPTI-MECHANICAL DISPLACEMENT INDICATOR WITH HIGH SENSITIVITY

[76] Inventor: Charles H. Popenoe, 6307 Wiscasset Rd., Bethesda, Md. 20816

[21] Appl. No.: 321,072

[22] Filed: Mar. 9, 1989

[51] Int. Cl.⁴ .............................................. F16B 31/12
[52] U.S. Cl. ....................................... 411/13; 411/14; 116/DIG. 34
[58] Field of Search ...................................... 411/8–14; 116/212, DIG. 34

[56] References Cited

U.S. PATENT DOCUMENTS 3,987,699  10/1976  Popenoe ................................. 411/13
4,771,999   9/1988  Takeuchi et al. ..................... 411/13
4,793,751  12/1988  Takeuchi et al. ..................... 411/13

Primary Examiner—Neill R. Wilson

[57] ABSTRACT

In an indicator for visually displaying extremely small displacements between two points within a structure, a change of color visible through an indicator window occurs during a preselected portion of a predetermined displacement within the structure. The color change occurs due to an increase in thickness of a light-absorbing fluid in the central area of a clear, flexible indicator means separating a colored portion from the indicator window. Substantially no light-absorbing fluid is permitted to enter the central area until a preselected displacement has occurred since the colored portion is firmly, resiliently biased against the indicator window until that amount of displacement has occurred. Thereafter, light-absorbing fluid is permitted to enter the central area. This device concentrates visual indications of displacements into limited segments of an overall displacement.

22 Claims, 3 Drawing Sheets

OPTI-MECHANICAL DISPLACEMENT INDICATOR WITH HIGH SENSITIVITY

TECHNICAL FIELD

The subject invention generally related to displacement indicators and, more particularly, to opti-mechanical indicators by means of which very small displacements or movements of one member relative to another are indicated via a change in intensity of color of an indicator observable by the human eye.

BACKGROUND OF THE INVENTION

There are many situations where the indication of very small distances or displacements is needed. For example, precision gauging instruments such as micrometers, dial indicators, feeler gauges, and electronic indicators have been required to provide precise settings or indications of minute displacements on the order of 0.0001 inch (2.5 μm). Replacement of such devices by a displacement indicator system relying only on optical indications of displacement changes discernible by the human eye would have the obvious potential advantages of simplicity in use and lower cost through elimination of peripheral equipment. These advantages would be further enhanced if the replacement system constituted an indicator incorporated within each object for which a precision adjustment is desired to be made.

Early prior art, such as U.S. Pat. Nos. 3,602,186 to Popenoe and 3,799,108 to Mosow, disclose attempts to achieve these advantages by means of indicators which changed color in coordination with a change in length of a fastening device, such as a threaded bolt, undergoing imposition of strain, stress or torque. The color change resulted from changes in light transmittance of a colored indicating fluid surrounding a colored disk at one end of the unstressed reference member due to changes in thickness of that fluid accompanying elongation of the stressed bolt relative to the unstressed member. However, these indicators, although demonstrably improving the art, suffered themselves from high manufacturing cost, complex manufacturing procedures and insufficient precision.

The precision with which an adjustment may be made depends, in turn, on the sensitivity of the indicator used. That sensitivity is related to the optical density of the indicating fluid. In other words, sensitivity relates to the thickness of fluid necessary to absorb some fraction of the light reflected from the colored indicator disk. The higher the optical density of the fluid, the smaller the deflection necessary to effect a change in color from bright to dark. The optical density of the fluid is controlled by the concentration of dye dissolved in the colorless carrier, which is usually a light mineral oil or silicone fluid. There is a limited solubility of the dye in the fluid so that, beyond a certain concentration, the dye will precipitate out at some lower temperature producing undesirable solid particles in the indicating fluid. A base fluid may be prepared by selecting a desired lower temperature limit and, by experimentation, determining the maximum concentration of dye powder in mineral oil which will not show precipitation until that lower temperature limit is reached. For purposes of the preferred embodiment, an arbitrary lower temperature limit of minus 18 degrees C. was selected. It should be understood that other temperature limits may also be used.

In order to define the optimal indicating fluid thickness, it is necessary to determine the relationship between light reflectance and fluid thickness. By measuring photoelectrically the light reflected through a prior art indicator from a red LED (650 nm) light source as a function of indicator thickness (indicating fluid layer thickness) and normalizing the resulting measurements with respect to the light reflected with zero fluid layer thickness, a "reflectance ratio" of the indicator versus the displacement from a zero thickness can be obtained on a semi-log scale. Since the light passing through the absorbing layer of fluid is inverse exponential, it will be linear on a semi-log plot. The slope of this linearized curve describes the optical density of the fluid and thus the sensitivity of the fluid-colored indicator combination. Since the response is similar to a "half-life" to quantify the optical density. Therefore, the fluid layer thickness which will transmit $1/e$ (about 37%) of the incident radiation is termed $t^*$ for purposes of this invention. For each $t^*$ thickness of fluid layer, some 63% of the initial radiation will be absorbed within that thickness. The base fluid prepared as above measures at $t^*$ of about 100 microinches. Tests on various human subjects show that the brightness or color change produced by a deflection of one $t^*$ is the best resolution attainable by the human eye.

Different $t^*$'s can be obtained by adding an appropriate amount of clear dilutant to the base fluid. Thus, by mixing base fluid ($t^*=100$) with an equal volume of diluant mineral oil, a fluid with a $t^*$ of 200 will result. Further experimentation has indicated, for example, that by using a bright red indicator disk and a dark blue fluid, microindicators change in color from bright red to black in about 10 $t^*$ or 1000 microinches (1 mil). Note that microindicators may display other color changes, such as a change from bright yellow to blue. This change corresponds to a reflectance ratio where less than 1% of the zero-thickness light remains, and most test subjects felt that the last vestige of red coloration had just disappeared so that the indicator could be described as "black" in color.

Prior art design is based on the concept that the microindicator on a loose bolt appears red while that on a tight bolt appears black, with shades in between signifying intermediate tension. According to elastic theory, the bolt strain equals the applied stress over the elastic modulus. The elastic modulus (Young's Modulus) is very nearly constant for a given material, regardless of heat treatment, alloy or bolt size. Thus, the strain or elongation of a bolt in inches per inch, is directly proportional to the applied stress, which is defined as the bolt tension per unit cross-sectional area. This has the effect that all high-carbon steel bolts (Grade 5), which have an ultimate tensile strength of 120,000 psi and when tightened to a stress of 90% of yield strength, or about 75,000 psi, which is typical will elongate about 2.5 thousandths of an inch per inch of bolt length, regardless of bolt diameter. Similarly, alloy steel bolts (Grade 8), which have a higher yield strength, will elongate about 3.4 mils per inch when tightened to the proper tension. Consequently, all bolts of a given grade, when tightened properly, will have nearly identical elongations in the range of 3-4 mils, if measured over the same length, and when actuating pins of lengths typified by this disclosure are used.

In order to make an effective, visual microindicator, a color change from red to black must occur when fluid layer thickness is increased by approximately 3 mils. Since the perceived red-to-black indication has been shown to correspond to about 10 t* displacement, a fluid with a t* of about 300 microinches is required. Additionally, since human color discrimination is limited to distinguishing an indicator color change corresponding to about one t*, an average operator can set a bolt to a tension corresponding to 10 t*, plus or minus about one t*, resulting in a bolt setting accuracy of plus or minus 10 percent. Although this level of accuracy exceeds that obtainable by using torque wrenches or other torqueing methods, it is insufficient for many engineering uses. In such cases, an accuracy as close to 2% as possible is desirable.

Since the perceptivity of the human eye is naturally limited, improved accuracy can only be obtained by improving the sensitivity of the microindicator. By using the most dense base fluid possible at which $t^* = 100$ microinches, the average operator can be expected to adjust elongation to within 100 microinches (or 1 t*). Analysis of typical actuating pin lengths and stress-strain relationships indicates that a 100 microinch elongation increment results from a stress increment of 2400 psi. The working stress of high-carbon steel bolt is bout 75,000 psi, while the working stress of an alloy steel bolt is about 100,000 psi. Therefore, using the densest base fluid, an operator can be expected to set tension by eye to within 3.2% (2400/75000) on a high-carbon steel bolt and to about 2.4% (2400/100,000) on an alloy bolt product. The result shows that approximately a four-fold improvement in precision is possible.

In order to obtain this improved precision, the indicator must be biased so that the microindicator is "engaged" only in the final portion of the total elongation, and is "free-wheeling" over the earlier portion. Further goals are ease of manufacture and either self-calibration or extremely easy calibration.

One way of accomplishing these goals is disclosed in U.S. Pat. No. 3,987,699 to Popenoe, FIGS. 7 and 10. In these embodiments, the operation of the indicator as disclosed in earlier patents, such as U.S. Pat. No. 3,602,186, is inverted. Thus, rather than the microindicator thickness increasing with elongation, the components are arranged such that the microindicator thickness *decreases* with increasing elongation. In this way, when a very dense base fluid ($t^* = 100$) is used, the microindicator will appear black when loose, and will continue to be black when tightened until the bolt has elongated such that the indicator thickness is less than 1 mil. Since the average bolt will elongate 3 mils per inch, or about 4 mils over the length of the typical actuating pin when properly tightened, the indicator will remain black until after the bolt is about 75% tightened, and then will gradually turn bright red over the final 25%, yielding the fourfold improvement in accuracy described above.

Several disadvantages may accompany the relevant embodiments of U.S. Pat. No. 3,987,699. If the actuating member or actuating pin is placed internally, as in FIG. 7, the mechanics may become complicated and may be easily damaged unless a double window is used. But, a double window may have the further problem of multiple internal reflections between the windows which would degrade the indication. If the actuating member is placed outside the shank of the bolt, as in FIG. 10, the fastener could become impractical to use due to possible corrosion and damage not present when all elements are embedded within the bolt.

SUMMARY OF THE INVENTION

The present invention is a means for increasing the sensitivity of an opti-mechanical displacement indicator while retaining simplicity of operation and mechanical arrangement. Changes in displacement between two points in a structure may be demonstrated by a change in color or brightness of an indicator associated with the structure such that achievement of a desired displacement is indicated by the appearance in the indicator of a preselected or predesignated color.

It is, therefore, a primary object of the subject invention to provide a means of improving the sensitivity of an indicator used in an opti-mechanical displacement indicator so as to obtain a sensitivity permitting adjustment within a range of accuracy of better than 4 percent while also maintaining mechanical simplicity and reliability of operation.

Another object of this invention is to provide an opti-mechanical displacement indicator for use with a fastener subject to a predetermined amount of elastic elongation during tightening wherein the color of the indicator remains constant during the major portion of the elongation and changes only during the final portion of the elongation, which is, the region of greatest interest.

Yet another object of the invention is to provide an opti-mechanical displacement indicator which may be designed and calibrated to become actuated during any of a wide range of partial displacements extending over a total displacement distance for a particular structure.

In one embodiment of the invention, the indicator is used in a bolt type fastener having an internal, unstressed actuating pin and a window mount ring with upper and lower shoulders which is attached securely to the bolt head to minimize the risk of damage to the mechanism. A loose transparent window having a rim is inserted between the shoulders of the window mount ring and is urged downward by a resilient O-ring which is placed beneath the upper shoulder. The indicator is an hermetically sealed flexible area containing light-absorbing fluid with two clear surfaces. One clear surface is adhesively attached to one side of the transparent window, while the other clear surface is adhesively attached to the head of the internal actuating pin on top of a colored disc. When the bolt is assembled, the head of the actuating pin is forced upward toward the transparent window displacing the light-absorbing fluid from the center into the periphery of the indicator. Sensitivity is improved by causing light-absorbing fluid to reenter the central portion of the indicator area only during a small part of the elastic length change of the fastener during tightening. Thus, as the fastener achieves its first 75% change in length due to the effects of tightening on the fastener material, there is no effect on the indicator since the actuating pin appears to retract, but the transparent window is allowed to follow the head of the actuating pin due to the resilient action of the O-ring. Therefore, no change in color occurs. However, after 75% of the elastic change in length has occurred, as fastener tightening continues, the lower shoulder of the window mount ring prevents the transparent window from further following the path of the actuating pin, thereby allowing light-absorbing fluid to reenter between the window and indicator disk. As a result, color changes are concentrated during the last part of the tightening process bringing about a four-fold increase in sensitivity of the indicator.

A second embodiment discloses a version of the invention which is calibrated in an unstressed state. A fixed, unstressed shank pin having a reduced diameter top section is inserted within a borehole in the fastener. A movable detached head having a longitudinal borehole and a latitudinal cross-drilled and reamed hole is installed onto a top section which may have a reduced diameter and held in place by a ground pin having a predetermined diameter less than that of the latitudinal reamed hole. An indicator containing light-absorbing fluid and having a colored lower disc surface is attached to the top of the movable head. When the bolt is assembled, the movable head is biased upward by a resilient rubber washer toward a transparent window which is fixedly attached to a mount ring displacing the light-absorbing fluid from the center into the periphery of the indicator. Sensitivity is improved by causing light-absorbing fluid to reenter the central portion of the indicator area only during the latter part of the elastic elongation of the fastener during tightening. In this case, fluid is prevented from reentering the indicator area during the first part of the elastic elongation of the fastener since the movable detached head is permitted to move upward, staying in firm contact with the transparent window, due to the biasing action of the resilient rubber and the play allowed by the difference in diameters between the latitudinal reamed hole in the head and the ground pin inserted therein.

In yet a third embodiment of the invention, two different color changes occur during the tightening of the fastener. In this embodiment, a cylindrical, unstressed actuating pin is fixedly inserted into a hollow actuating pin head against a resilient ball which biases a plunger having a diameter less than that of the actuating pin head upward to a point above the pin head. In this case, the indicator is again a clear, flexible area containing light-absorbing fluid. However, there are two differently colored surfaces, the first constitutes the head of the plunger and the second constitutes the remaining ring area of the actuating pin head. When the bolt is assembled, the plunger is forced downward against the biasing force of the resilient ball until its upper surface is even with the ringed upper surface of the actuating pin head and the light-absorbing fluid is forced out of the indicator. As tightening forces are applied, the fastener begins to elongate causing the tubular actuating pin head to appear to retract within the surface of the fastener and allowing light-absorbing fluid to reenter the indicator in the outer area circling the plunger which continues to be biased upward toward the transparent window. During this period, a color change occurs in the outer ring area of the actuating pin head while no color change occurs in the central head area of the plunger. As tightening continues, further upward movement of the plunger is prevented by interaction of its peripheral shoulder with a stop cut into the interior of the hollow actuating pin head. At this point, light-absorbing fluid also begins to penetrate the indicator in the area covering the plunger resulting in a gradual color change there.

BRIEF DESCRIPTION OF THE DRAWINGS

The foregoing and other objects, aspects and advantages of the invention will be better understood from the following detailed description of the invention with references to the drawings, in which.

DETAILED DESCRIPTION OF THE PREFERRED
EMBODIMENT OF THE INVENTION

Figure 1:
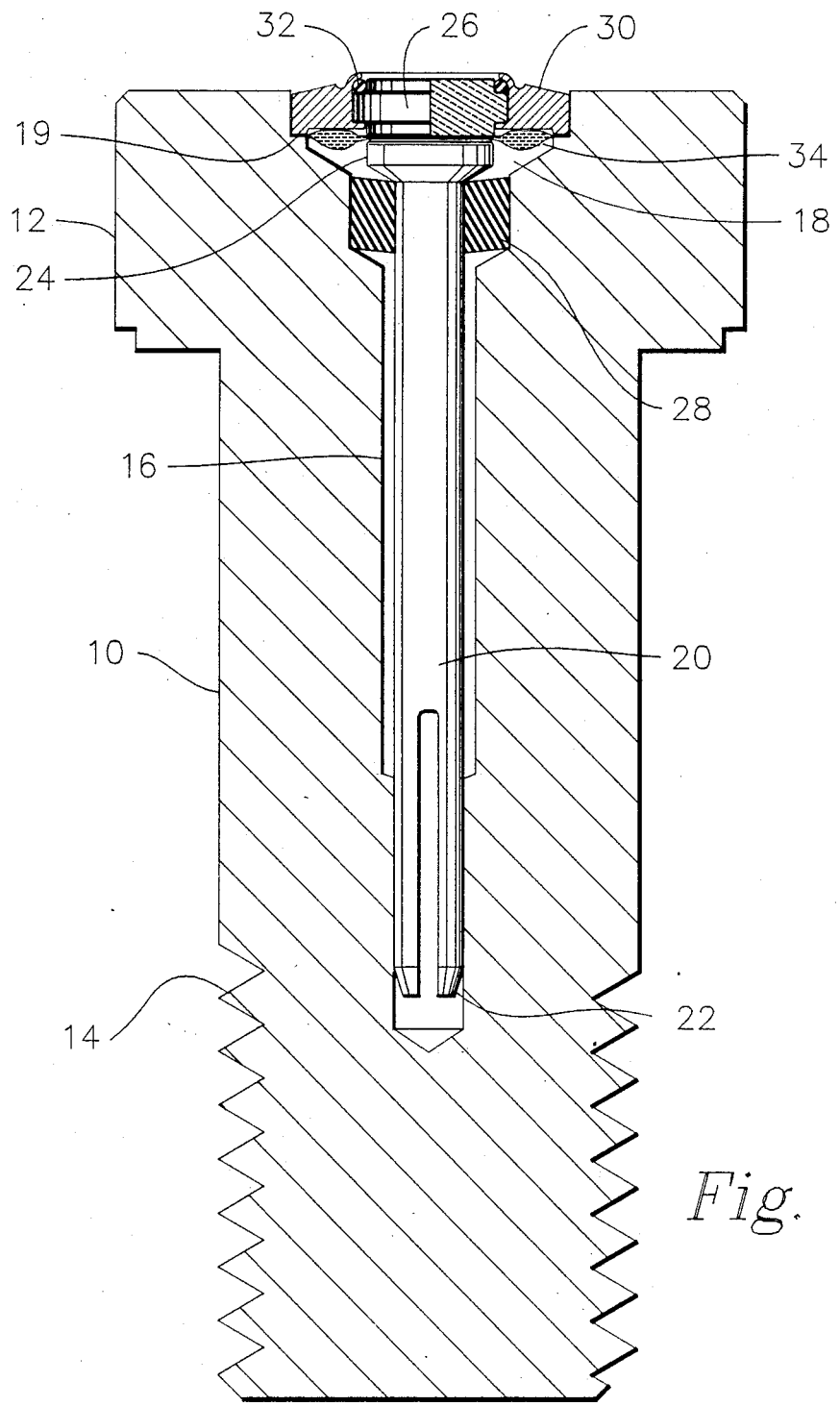
FIG. 1 is a cross sectional view of the preferred embodiment of the present invention showing an indicator used as a tension indicator in a bolt.
Figure 2:
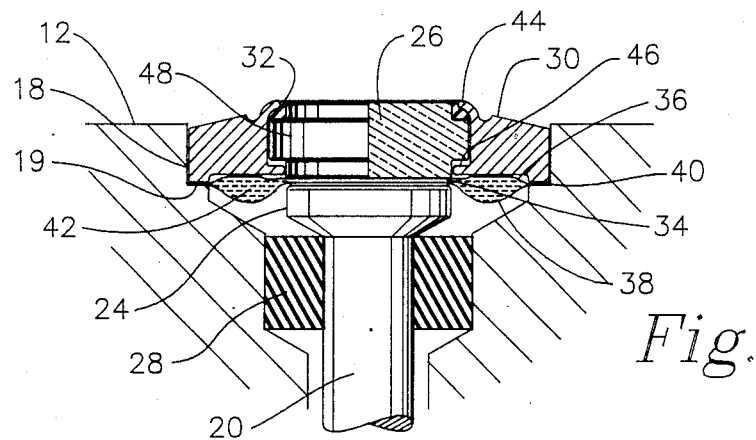
FIG. 2 is a cross-sectional view of the indicator window area of a bolt according to a preferred embodiment of the invention in which no stress has been applied to the bolt.
Figure 3:
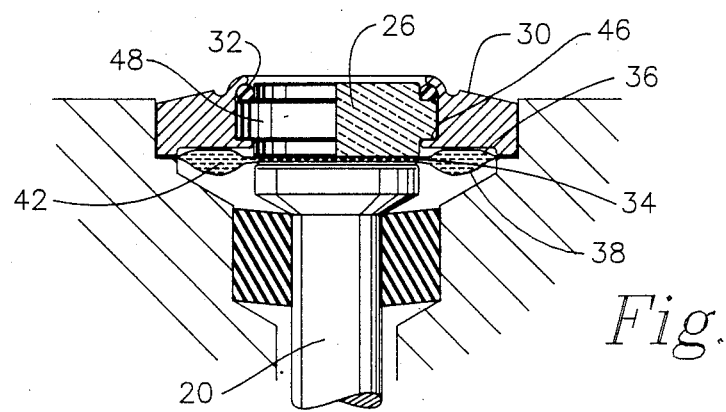
FIG. 3 is a cross-sectional view of the indicator window area of a bolt according to a preferred embodiment of the invention in which the bolt has been tightened to approximately 75% of its design tension.
Figure 4:
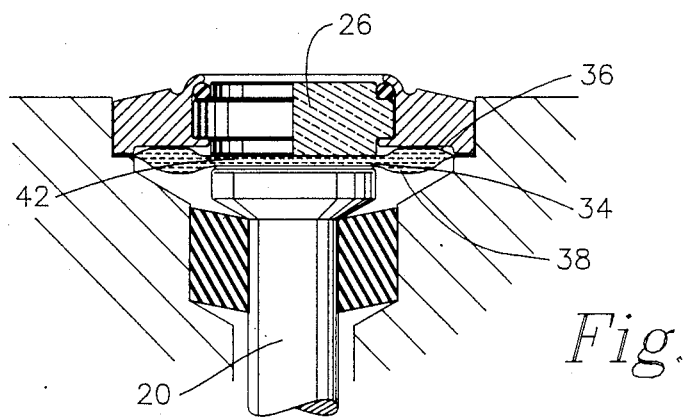
FIG. 4 is a cross-sectional view of the indicator window area of a bolt according to a preferred embodiment of the invention in which the bolt has been tightened to approximately 100% of its design tension.

For a more detailed understanding of the invention, reference is first made to FIG. 1 of the drawings. In this figure, reference numeral 10 generally designates a bolt containing an indicator in accordance with the present invention. The bolt has a head 12 usually in the form of a square or hexagon so that it may be turned with a wrench, and a lower threaded end 14 for insertion in the threaded hole of a member to be fastened, or alternatively for use with a nut to fasten two mechanical members together in conventional fashion. An axial bore 16 extends from head 12 to a point near the threaded end of bolt 10 and is countersunk to provide a large bore or recess 18 which includes a stop 19 around its outer periphery. An actuating pin or rod 20 is inserted into the bore 16 and is held in place during assembly and calibration by means of friction resulting from a tight fit between bifurcated legs 22 at the lower end of pin 20 and the walls of axial bore 16. A small amount of adhesive fixes pin 20 permanently in place after calibration. In this way pin 20 can be set at any position in the axial bore 16 and will remain at the position until the adhesive hardens. The opposite end of pin 20 terminates in a head 24 having a colored surface on one side which faces movable indicator window 26. Resilient silicone washer 28 serves to center pin 20 at its head end and to damp any vibrations during its subsequent application. Maximum upward movement of indicator window 26 is limited by window mount ring 30 while a resilient O-ring 32 is placed at the top of window mount ring 30 to bias indicator window 26 downward. Head 24 and indicator window 26 are separated from each other by a flexible indicator area 34. FIGS. 2 through 4 sequentially illustrate operation of the invention as stress is applied to the fastener through greatly magnified cross-sectional views of the upper portion of the actuating pin and indicator window.

FIG. 2 illustrates a cross-sectional view of the indicator window area of the preferred embodiment before any stress has been applied to the bolt. In FIG. 2, flexible indicator area 34 is fixed to the upper surface of head 24. The thickness of the indicator area in all of the drawings is greatly exaggerated for clarity. In actual practice, the thickness of area 34 would be only several thousandths of an inch. This area is comprised of an upper layer of clear, flexible plastic 36 which is sealed to a lower layer of clear, flexible plastic 38 at the periphery 40 so as to fully enclose a mass of a dark, light-absorbing indicating fluid 42. The flexibility of the plastic layers 36 and 38 permits the area 34 to bulge out around the periphery of actuating pin head 24 in order to compensate for the compression of the fluid containing means above actuating pin head 24. Consequently, FIG. 2 shows no fluid in the layer between head 24 and window 26 so that light may be freely transmitted from head 24 to window 26. Head 24 is preferably fixed by an adhesive to lower layer 38. The top surface of upper layer 36 is contacted by and preferably fixed by a clear adhesive to, the lower surface of window 26 which is made of glass, plastic or other suitable transparent or translucent material through which light may be transmitted. If desired, the colored disc on head 24 could be replaced by a colored area in lower layer 38.

In the preferred embodiment, the indicating bolt is assembled and calibrated at its design tension. A small amount of anaerobic adhesive is dispensed into axial hole 16 and pin 20 is inserted partially therein. Area 34 is placed on head 24 of pin 20 with a small amount of adhesive applied to both sides of area 34. Pin 20 is next pressed further into axial hole 16 by forcing down mount ring 30 into large bore 18 until further movement is prevented by stop 19.

Mount ring 30 is constructed to include a cavity bordered by an upper shoulder 44 and a lower shoulder 46. Indicator window 26 is inserted between the upper and lower shoulders and is held there due to a rim 48 extending around the window's midsection having a height a which is less than the distance b between the upper shoulder 44 and the lower shoulder 46, allowing an amount of movement of the window somewhat greater than the retraction of the pin at design tension. Since the width of rim 48 is slightly less than the distance c between the most widely separated walls of the cavity in mounting ring 30, indicator window 26 is free to move within the mount ring 30 between upper shoulder 44 and lower shoulder 46. Resilient O-ring 32 is inserted directly on top of window 26 in mount ring 30 after which upper shoulder 44 is formed through mechanical deformation of mount ring 30 so as to capture window 26 and apply a slight downward force on O-ring 32 and window When mount ring 30 is pressed down onto pin 20, the resulting pressure exerted between head 24 and the bottom of indicator window 26 initially drives indicator window 26 upwardly so as to compress O-ring 32 against upper shoulder 44 while also displacing the light absorbing fluid 42 out of area 34. When the spring force of resilient O-ring 32 exceeds the force required to move down pin 20, the pin will be pressed down into axial hole 16 until the mount ring 30 abuts stop 19 in the large bore 18 and further movement is prevented. Mount ring 30 is then permanently staked into position in head 12. In this position, indicator window 26 has been driven approximately 5 mils up into the mount ring 30, compressing O-ring 32, and the anerobic adhesive is, as yet, unhardened. By placing the bolt into a calibrator and tensioning it to a previously determined tension near the design tension, the bolt elongates approximately 3 mils, causing the pin 20 to appear to retract a similar distance downward into the bolt. Simultaneously, indicator window 26 follows pin 20 downwards since it is free to move and is biased downward by the resiliency of O-ring 32. However, additional externally applied force must still be applied to indicator window 26 to force it a further 2 mils downward until it abuts against lower shoulder 46 of mounting ring 30. Similarly, pin 20 is also forced downward an additional 2 mils by application of the external force at which point it remains because of the spring force of the bifurcated legs. This procedure completes calibration of the indicator. When the tensile load is released, the bolt 10 returns to its relaxed length, leaving pin 20 extending approximately 3 mils upward so as to compress indicator window 26 back into mount ring 30 and equal amount against the resilient spring force of O-ring 32. This is the position of the bolt shown in FIG. 2.

FIGS. 3 and 4 illustrate the positions of various parts of the indicator when placed into actual use. As the bolt is tensioned, it elongates, causing pin 20 to appear to retract. Indicator window 26 will follow pin 20 (which remains unstressed) due to the resilient action of partially compressed O-ring 32. Downward movement of indicator window 26 will continue until further movement is prevented when rim 48 abuts against lower shoulder 46 of mounting ring 30 which occurs after pin 20 has moved a distance of approximately 3 mils and resilient O-ring 32 is nearing an uncompressed state. FIG. 3 shows a cross-sectional view of the indicator window in this state. Since the total retraction of pin 20 during tensioning is expected to be some 3 to 4 mils, FIG. 3 shows pin 20 after bolt 10 has elongated 75% of the total, expected elongation. Further, since O-ring 32 has firmly biased indicator window 26 downward against actuating pin head 24 during this period, light-absorbing fluid 42 has been kept out of the central portion of area 34 so that light has continued to be transmitted normally from lower colored disc 38 through upper clear plastic disc 36 and indicator window 26 without any apparent change in color.

FIG. 4 shows the position of elements in the indicator window area after the bolt has been tightened to its full design tension. As still further tension is exerted on bolt 10, further elongation of the bolt causes pin 20 to appear to retract from indicator window 26, allowing light-absorbing fluid 42 to reenter area 34 between window 26 and colored head 24 so as to alter the transmission of light from the colored head 24 to indicator window 26 and, hence, cause the color of colored head 24 to appear to darken. As pin 20 retracts further, the color change continues, until a distance of 1 mil has been traversed, at which point the lower colored disk 38 appears black and 100% design tension has been achieved. Thus, in the preferred embodiment, all of the color change has occurred within the last 25% of elongation of the bolt, providing an increase in sensitivity of approximately four-fold over the prior art.

Figure 5:
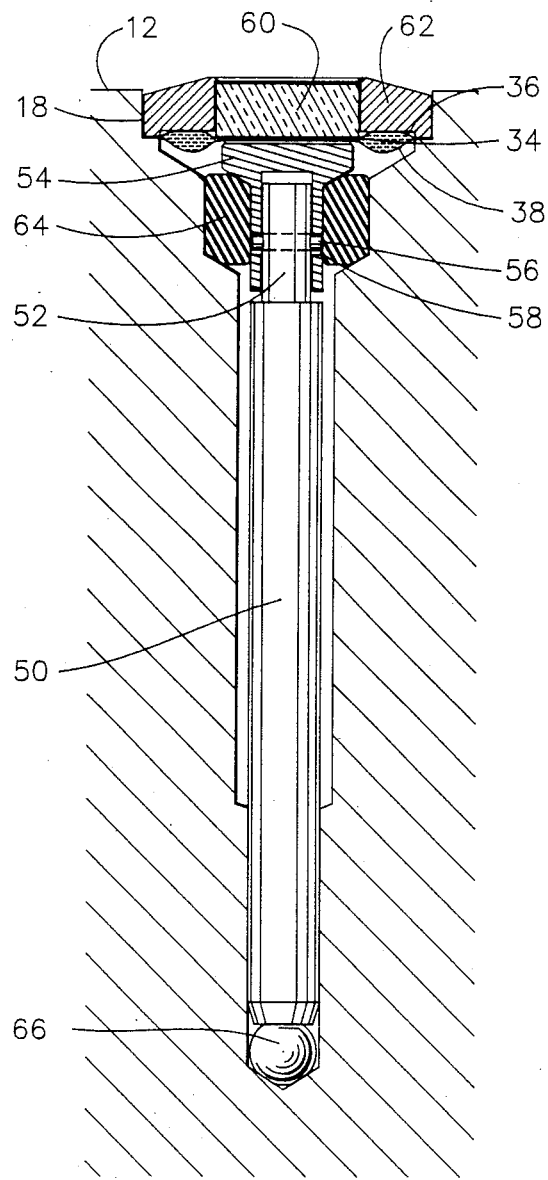
FIG. 5 is a cross-sectional view of the central portion of a bolt showing an alternative embodiment of the present invention wherein the indicator is calibrated in a relaxed mode, and the design set point is predetermined by the geometric relationship between a cross-drilled hole and ground pin.

FIG. 5 illustrates an alternative embodiment of the device of the invention in which calibration may be accomplished when the bolt is in a relaxed condition. This is a simpler and less expensive calibration than that required for the preferred embodiment, but relies on uniformity of bolt dimensions and materials for accuracy of the design tension, and, therefore, may result in a less accurate calibration than the preferred embodiment. A shank pin 50 is constructed with a reduced diameter top section 52. A detached head 54 having a colored outer surface and formed similar to a tubular rivet slides loosely over top section 52 and is fastened thereto by means of a ground pin 56 which fits into a cross-drilled and reamed hole 58. Since ground pin 56 is designed to be smaller in diameter by a predetermined amount than reamed hole 58, detached head 54 is free to move a distance equal to that predetermined difference. Ground pin 56 is designed to fit loosely into the cross-drilled, reamed hole 58 in the portion of that hole traversing detached head 54 but fits tightly into the portion of hole 58 traversing through the reduced-diameter top section 52 of pin 50. Alternatively, ground pin 56 could fit tightly into the portion of hole 58 traversing head 54 and loosely in the portion of hole 58 traversing top section 52. The purpose of both arrangements is to ensure accuracy and repeatability of actuation during use. As in the preferred embodiment, flexible indicator area 34 includes a clear, flexible upper layer 36 and a clear, flexible lower layer 38 and is located between detached head 54 and a transparent window 60 which is fixedly attached to bolt 12 by window mount ring 62. A resilient washer 64, which may, for example, be a spring or made of rubber, firmly biases the colored surface of detached head 54 upwardly towards window 60. Consequently, light may be freely reflected from the colored surface of head 54 and transmitted through window 60. As bolt 12 is subjected to tightening forces, it elongates, causing shank 50 (which remains unstressed) to appear to be drawn downward. However, the colored surface of detached head 54 continues to remain firmly pressed against area 34 and window 60 due to the biasing action of resilient washer 64 and the difference in diameters between ground pin 56 and reamed hole 58 which permits detached head 54 to move upward. Consequently, during this period, no light-absorbing fluid enters the central portion of area 34 where detached head 54 and window 60 abut. At a predetermined tension, which occurs after the bolt has elongated a major portion of its maximum expected elongation, such as after 75 percent of such elongation, ground pin 56 encounters the lower edge of reamed hole 58 and prevents detached head 54 from further upward movement. At this point, light-absorbing fluid begins to enter the central portion of flexible indicator area 34 causing its thickness to increase and the color of the colored surface on detached head 54 to appear to change in a manner similar to that described above for the preferred embodiment. This embodiment achieves the same increase in sensitivity as the preferred embodiment but will not be characterized by the same accuracy, since it will not be calibrated at the design tension. This embodiment, however, is much better suited to mass production.

In this first alternative embodiment, the indicating bolt is assembled and calibrated at a relaxed tension. A resilient ball 66 is inserted into the axial hole 16 followed by a small quantity of anaerobic or other suitable adhesive and resilient washer 64. Detached head 54 is then slid on top of reduced diameter top section 52 of shank pin 50 and ground pin 56 is inserted into ream hole 58. Shank pin 50 with detached head 54 attached is then inserted into the loosely fitting hole, and flexible indicator area 34 with adhesive on both sides is placed atop detached head 54. Finally, window mount ring 62, which includes transparent window 60 attached thereto, is placed into large bore 18 and staked into position. Resilient ball 66 acts to exert a spring force to urge pin 50 upward against detached head 54 during assembly, forcing ground pin 56 against the upper limit of reamed hole 58. This procedure eliminates any free motion of detached head 54 when is a relaxed, unstressed condition.

Figure 6:
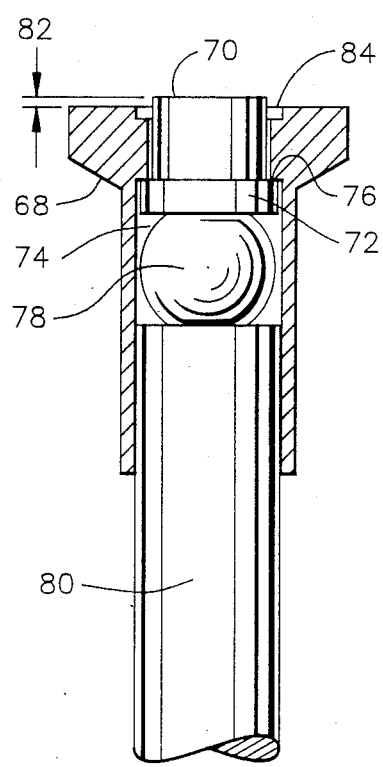
FIG. 6 is a cross-sectional view of another embodiment of the present invention showing an alternative construction of the actuating pin head providing two areas of separate, sequential color change to indicate tightening of a bolt.

In yet another alternative embodiment of the invention two areas of separate, sequential color change appear during tightening of a bolt due to the construction of the actuating pin head. FIG. 6 illustrates in greatly magnified detail only the crucial aspects of this alternative actuating pin head construction. In this embodiment, the actuating pin head 68 includes a cylindrical plunger 70 having a peripheral shoulder 72 which is inserted with a sliding fit into a hole 74 drilled into the center of actuating pin head 68. Hole 74 is counterbored from the bottom to form a stop 76. When plunger 70 is inserted into hole 74, further upward movement is prevented when shoulder 72 abuts stop 76. Plunger 70 is biased upward by a resilient ball 78 or similar spring device which is placed within hole 74 before actuating pin head 68 is mounted on top of cylindrical actuating pin 80 by a press fit or adhesive means. Upon assembly of the actuating pin 80, the head of plunger 70 extends a predetermined amount, approximately 3 mils, indicated by double arrows 82, beyond the top of actuating pin head 68 due to the upward biasing effect of ball 78. A circular relief 84 is formed around the periphery of the plunger to allow space for normal flexing of flexible indicator area 34 (not shown in FIG. 6) during actuation. When this actuating pin assembly is installed in an indicator bolt, it will appear in cross section prior to exertion of tension on the bolt similar to the embodiment illustrated in FIG. 5. Loosely fitted actuating pin 80 and fixed head 68 will be biased upwardly by resilient ball 78 and resilient washer 64, respectively, against flexible indicator area 34 in the direction of fixed transparent window 60 so that substantially light-absorbing fluid will be displaced out to the periphery of area 34 and plunger 70 will be driven downward 3 mils against the biasing action of resilient rubber ball 78 until its surface is flatly even with the rest of actuating pin head 68.

In this embodiment, the most optically dense indicating fluid ($t^* = 100$ microinches) may be used, and more than one color or brightness change occurs during tightening of the fastener. As the bolt is tightened, it elongates, and a ring of fluid will begin to enter the outer ring area surrounding plunger 70 which remains in firm upwardly biased contact with area 34 preventing and light-absorbing fluid from penetrating the central portion of area 34 in the inner circular surface area defined by the head of plunger 70. Consequently, the color or brightness of the outer ring into which fluid has penetrated will begin to darken, while the color of the inner circular area defined by the head of plunger 70 will remain bright and unchanged. By design, the outer ring will appear black at the point at which shoulder 72 abuts stop 76. Further tightening of the bolt then causes actuating pin 80 to continue its apparent retraction into the bolt with the effect that light-absorbing fluid begins to enter area 34 in the space created between the head of plunger 70 and transparent window 60, causing the color of the inner circular area to begin to darken until it too eventually becomes totally black.

An especially effective sequence of color change results from coloring the outer ring area of the actuating pin head 68 a bright red color and the inner circular surface area of plunger 70 a bright yellow color and using a dark blue light-absorbing fluid. With this arrangement, a loose bolt indicates predominantly bright red, with a yellow dot in the center, signifying a loose or "danger" condition. As the bolt is tightened to 25% of design tension, the bright red outer indicator ring darkens to a black visual appearance, but the central portion remains a bright yellow, signifying "caution". This yellow caution indication remains bright for tensions between 25% and 75% of design tension signifying that the bolt is tensioned in its mid-range. At 75% of design tension, the central plunger reaches its stop and begins retracting from the window with further tightening. The combination of the yellow indicator area and blue fluid results in a green indication at design tension, signifying a "safe" or "go" condition. Further tightening causes the green to turn to a dark blue and finally black as it is severely overtightened. Thus, as the bolt is tightened within its normal operating range, the indicator changes from bright red to yellow to green, presenting the operator with a much improved visual tension resolution than in any previous embodiment of the invention. Since the most optically dense indicating fluid is used, the highest attainable precision is also retained.

The embodiment of FIG. 6 may be calibrated in the relaxed condition as described in U.S. Pat. No. 3,987,699. This method would rely on the resilient washer 64 under the actuating pin head 68 to bias the head against the transparent window 60 while the adhesive hardened. The amount of projection of the plunger head 70 above the actuating pin head 68 would determine the tension at which the central portion of the indicator would start changing its appearance and could be calculated in advance.

Obviously, the embodiments described above may be employed in combination to produce desirable results. For instance, the multicolor plunger pin of FIG. 6 might be combined with the moveable indicator window and bifurcated actuating pin of FIGS. 2-4. Such a combination could be calibrated at some intermediate tension to alter the tension values at which the various color changes occur. For instance, bolts could be produced having an indication which would be red when the applied tension was less than 50% of design tension, yellow between 50% and 75%, and green at the design condition. It is further evident that the indicator of this invention can be employed in a wide variety of applications other than bolts. The term displacement indicator is thus used in a generic sense and is intended to encompass all such applications of the invention including, for example, not only applications in which actual displacement between two parts are measured but applications in which stress or strain is measured. Other applications of the invention comprise placing the indicator in an unstressed condition in a structure or mechanism which may be subject to successive stresses, such as a mine roof, bridge, a critical portion of an airplane wing, etc. If these parts become stressed or strained to a dangerous condition, the device can be calibrated so that this will be shown by an appropriate color change in the indicator, obviating the need for special measuring tools.

It should also be emphasized that this indicator may be used to produce changes in intensity not only in visible light, but also in infra-red, ultra-violet, beta radiation or any wavelength of electromagnetic radiation which is desired and according to the absorbing fluid. Therefore, the use of the term "light" in this specification and claims, is not limited to visible radiation, but may refer to radiation in any part of the electromagnetic spectrum. Furthermore, the opti-mechanical displacement indicator of this invention may be used with any structure in which extremely small displacements between two points is desired to be measured and is not limited to use in bolts or fasteners.

I claim:

1. A device for visually indicating extremely small changes in displacement between two points of a structure through changes in color or brightness comprising:
   actuating means for responding in a predetermined manner to a displacement between the two points in the structure;
   a colored indicator portion attached to said actuating means;
   an indicator window;
   window mount means attached to the structure in axial relationship with said actuating means for holding and limiting the movement of said indicator window;
   biasing means for resiliently biasing said colored indicator portion and said indicator window towards each other;
   means for absorbing an initial portion of the relative displacement between said two points until a preselected displacement has occurred, and transmitting subsequent displacement to vary the distance between said indicator windows and said colored indicator portion: and
   flexible indicator means positioned between said indicator window and said colored indicator portion for altering the amount of light transmitted to said indicator window from said colored indicator portion, whereby the observed color change of the indicator will be concentrated in a selected portion of the total displacement change between the said two points.

2. The device of claim 1, wherein said actuating means further comprises an unstressed actuating pin having a head portion at one end thereof and wherein said actuating means remains fixed at a stationary position within the structure while displacement between the two points occurs.

3. The device of claim 2, wherein said flexible indicator means is filled with light-absorbing fluid and has a portion of one side thereof fixed to the head portion of said actuating means while a portion of the other side thereof is fixed to said indicator window.

4. The device of claim 3, wherein alteration of the amount of light transmitted to said indicator window occurs due to a change in thickness of the light-absorbing fluid contained between the fixed portions of the two sides of said flexible indicator means.

5. The device of claim 4, wherein said window mount means is comprised of
   upper and lower shoulder rings formed by a grooved center borehole; and
   resilient ring means located under the upper shoulder ring for biasing said indicator window towards the lower shoulder ring.

6. The device of claim 5, wherein said indicator window includes:
   A cylindrically shaped central body having a diameter slightly less than that of the circle formed by either of the upper or lower shoulder rings in said window mount means and having a height exceeding the height of the grooved center borehole in said window mount means; and a cylindrically shaped rim having a diameter greater than the diameter of the circle formed by either of the upper or lower shoulder rings in said window mount means but less than the diameter at its widest point of the groove in the grooved center borehole in said window mount means and having a height less than the distance separating the upper and lower shoulder rings of the grooved center borehole in said window mount means.

7. The device of claim 6, wherein the cylindrically shaped rim of said indicator window is loosely held in position between the upper and lower shoulders of said window mount means and said biasing means acts against the cylindrically shaped rim of said indicator window.

8. The device of claim 7, wherein sufficient force is exerted by said biasing means against the cylindrically shaped rim of said indicator window while the structure is undergoing displacement to hold the cylindrically shaped central body of said indicator window in movably firm direct contact with one side of said flexible indicator means and in simultaneous indirect contact with the other side of said flexible indicator means, substantially excluding light-absorbing fluid from between those sides of said flexible indicator means until a preselected portion of the preselected, desired displacement has occurred within the structure.

9. The device of claim 8, wherein the lower shoulder ring of said window mount means prevents further movement of said indicator window after more than the preselected portion of the preselected, desired displacement has occurred within the structure allowing increasing amounts of light-absorbing fluid to enter said flexible indicator means between the fixed portions of the two sides thereof as displacement of the two points exceeds the preselected portion of the preselected, desired displacement.

10. The device of claim 9, wherein said colored indicator portion is a colored disc attached to the head portion of said actuating means.

11. The device of claim 9, wherein said colored indicator portion is contained within the portion of the one side of said flexible indicator means fixed to the head portion of said actuating means.

12. A device for visually indicating extremely small changes in displacement between two points of a structure through changes in color or brightness comprising:

an unstressed actuating pin wherein said unstressed actuating pin remains fixed at a stationary position within the structure while displacement between the two points in the structure occurs;

an indicator window fixedly attached to the structure in axial relationship with said unstressed actuating pin;

a detachable head movably attached to said unstressed actuating pin in axial relationship with said indicator window wherein the direction and amount of axial motion of said detachable head is predetermined;

a colored indicator portion attached to said detachable head at one end thereof;

biasing means for resiliently biasing said detachable head in the direction of said indicator window;

flexible indicator means filled with light-absorbing fluid having a portion of one side thereof fixed to said detachable head while a portion of the other side thereof is fixed to said indicator window for indicating a change in displacement in the structure by altering the amount of light reflected to said indicator window from said colored indicator portion in response to changes in thickness of the light-absorbing fluid contained between the two fixed portions of said flexible indicator means, wherein a change in thickness of the light-absorbing fluid occurs only as displacement between the two points within the structure approaches a preselected, desired magnitude.

13. The device of claim 12, wherein said detachable head is movably attached to said unstressed actuating pin by means of a ground pin inserted into a reamed hole extending through said detachable head and said actuating pin, the ground pin having a diameter less than the diameter of the reamed hole.

14. The device of claim 13, wherein the amount of motion of said detachable head is determined by the relationship between the diameter of the ground pin and the diameter of the reamed hole.

15. The device of claim 14, wherein the diameter of said ground pin is selected to permit said detachable head to move only during displacement within the structure of amounts less than the preselected, desired magnitude.

16. The device of claim 15, wherein sufficient force is exerted by said biasing means against said detachable head while the structure is being displaced to hold said colored indicator portion in movably firm direct contact with one side of said flexible indicator means and in simultaneous indirect contact with the other side of said flexible indicator means, substantially eliminating light-absorbing fluid from between the two sides of said flexible indicator means until a major portion of the preselected, desired displacement has occurred.

17. The device of claim 16, wherein the light-absorbing fluid begins to reenter between the fixed portions of said flexible indicator means after approximately 75 percent of the preselected. desired displacement has occurred within the structure.

18. The device of claim 17, wherein the ground pin abuts the edge of the reamed hole so as to prevent further movement of said detachable head after more than approximately 75 percent of the preselected, desired displacement has occurred within the structure allowing increasing amounts of light-absorbing fluid to reenter said flexible indicator means as displacement exceeds approximately 75 percent of the preselected, desired magnitude.

19. A device for visually indicating extremely small changes in displacement between two points of a structure through changes in color or brightness comprising:

an unstressed actuating pin fixedly attached within the structure at one end while displacement between the two points in the structure occurs;

an indicator window fixedly attached to the structure in axial relationship with said unstressed actuating pin;

a plunger having a colored circular area on one end thereof;

a detachable tubular head fixedly attached to said actuating pin having a central circular borehole drilled therein and an outer circular borehole countersunk therein to form a stop wherein the boreholes are made from one end thereof while a colored annular area is on the opposite end thereof;

biasing means for resiliently biasing said plunger in the direction of said indicator window through the central circular borehole in said detachable tubular head;

flexible indicator means filled with light-absorbing fluid having a portion of one side thereof fixed to both the colored annular area of said detachable tubular head and the colored circular area of said plunger while a portion of the other side thereof is fixed to said indicator window for indicating a change in displacement in the structure by altering the amount of light. reflected to said indicator window from the colored annular area of said detachable head and from the colored circular area of said plunger in response to changes in thickness of the light-absorbing fluid contained between the fixed portions of said flexible indicator means wherein a change in thickness of the light-absorbing fluid occurs in the colored annular area of said detachable head throughout the period during which displacement in the structure occurs whereas a change in thickness of the light-absorbing fluid occurs in the colored circular area of said plunger only as displacement between the two points in the structure approaches a preselected, desired magnitude.

20. The device of claim 19 wherein said plunger is comprised of a cylindrically shaped central body having a diameter slightly less that that of the central circular borehole drilled into said detachable tubular head; and a cylindrically shaped rim having a diameter greater than the diameter of the central circular borehole drilled into said detachable tubular head but less than the diameter of the outer circular borehole countersunk into said detachable tubular head.

21. The device of claim 20, wherein sufficient force is exerted by said biasing means against said plunger while displacement occurs to hold the cylindrically shaped central body of said plunger in movably firm direct contact with one side of said flexible indicator means and in simultaneous indirect contact with the other side of said flexible indicator means, substantially excluding light-absorbing fluid from between the fixed portions of said flexible indicator means defined by the colored circular area of said plunger until a preselected portion of the preselected, desired displacement has occurred and wherein an amount of light-absorbing fluid is immediately admitted between the fixed portions of said flexible indicator means defined by the colored annular area of said detachable tubular head in direct relationship with any increase in displacement in the structure.

22. The device of claim 21, wherein the stop formed in said detachable tubular head prevents further movement of said plunger after more than a preselected portion of the preselected, desired displacement in the structure has occurred allowing an increase amount of light-absorbing fluid to enter said flexible indicator means between the fixed portions thereof defined by the colored circular area of said plunger as displacement increases beyond a preselected level.

* * * * *